US007637475B2

(12) United States Patent
Adams

(10) Patent No.: US 7,637,475 B2
(45) Date of Patent: Dec. 29, 2009

(54) SOLENOID

(75) Inventor: Ross R. Adams, Carlton, GA (US)

(73) Assignee: Kurz-Kasch, Inc., Miamisburg, OH (US)

( * ) Notice: Subject to any disclaimer, the term of this patent is extended or adjusted under 35 U.S.C. 154(b) by 7 days.

(21) Appl. No.: 11/691,194

(22) Filed: Mar. 26, 2007

(65) Prior Publication Data

US 2007/0236315 A1 Oct. 11, 2007

Related U.S. Application Data

(63) Continuation-in-part of application No. 11/129,866, filed on May 16, 2005, now Pat. No. 7,196,602.

(51) Int. Cl.
*F16K 31/02* (2006.01)
*H01F 7/08* (2006.01)

(52) U.S. Cl. ............................ 251/129.01; 251/129.02; 251/129.17; 335/229; 335/234; 335/264; 335/265; 335/266

(58) Field of Classification Search ......... 335/229–234, 335/259, 264–267; 251/129.01–129.22
See application file for complete search history.

(56) References Cited

U.S. PATENT DOCUMENTS 5,497,135 A * 3/1996 Wisskirchen et al. ........ 335/253
6,337,635 B1 1/2002 Ericksen et al.

* cited by examiner

*Primary Examiner*—Ramon M Barrera
(74) *Attorney, Agent, or Firm*—Polster, Lieder, Woodruff & Lucchesi, L.C.

(57) ABSTRACT

A solenoid is provided which, in the preferred embodiment, has a housing having an axial opening in it. The housing has a divider mounted in the axial opening to separate the axial opening into a first segment and a second segment. Respective ones of a first pole piece and a second pole piece are located on opposite sides of the divider. The first pole piece is moveable with the first segment between an extended position and a retracted position, the first pole piece having a plunger positioned at an end of the first pole piece. A permanent magnet is moveably mounted from the axial opening and is moveable independently of the second pole piece between at least a first position adjacent to the divider, and a second position adjacent the second pole piece. The construction provides a fast acting, low cost latching solenoid construction.

17 Claims, 5 Drawing Sheets

SOLENOID

CROSS REFERENCE TO RELATED APPLICATIONS

This application is a continuation-in-part of U.S. patent application Ser. No. 11/129,866, filed on May 16, 2005, and claims priority to U.S. patent application Ser. No. 11/129,866, the application being incorporated herein by reference.

STATEMENT REGARDING FEDERALLY SPONSORED RESEARCH OR DEVELOPMENT

N/A

BACKGROUND

This disclosure relates to solenoid constructions, and in particular, to a low cost solenoid having improved operating characteristics. While the disclosure is described in particular detail with respect to certain preferred applications of the solenoid, those skilled in the art will recognize the wider applicability of the inventive principles disclosed hereinafter.

A conventional solenoid is designed so that magnetic force is exerted across an air gap generally perpendicular to the pole pieces in such a manner as to close the gap. Latching solenoids also are well known in this device, wherein a plunger moves from its first to second position. The plunger is maintained in the second position until a physical force is exerted on the plunger to return it to its initial starting position.

We have determined that a relatively efficient, and low cost solenoid construction can be obtained by utilizing in its simplest form, a freely moveable permanent magnet which operates between first and second pole pieces to operate the solenoid in a unique fashion. In this construction, a divider separates the first and second pole pieces.

SUMMARY

The present disclosure relates to a solenoid construction. In an embodiment, the present disclosure relates to a housing having an axial length, an external surface, an axial opening extending through the axial length and a divider mounted in the axial opening to separate the axial opening into a first segment and a second segment. A first pole piece is moveable with the first segment between an extended position and a retracted position. The first pole piece has a plunger positioned at an end of the first pole piece. A second pole piece is fixed within the second segment.

A permanent magnet is positioned within the second segment between the divider and the second pole piece. The permanent magnet is movable within the second segment between a first position adjacent the second pole piece and a second position adjacent the divider, wherein the permanent magnet in the second position draws the first pole piece from the extended position to the retracted position to magnetically couple the first pole piece to the permanent magnet and to move the plunger toward the divider.

In an embodiment, the present disclosure relates to regulating fluid flow through a valve device by operating the solenoid. The method of regulation comprises applying a magnetic force to the permanent magnet while the permanent magnet is disposed within the second segment to reciprocate the permanent magnet between the first position and the second position within the second segment. The permanent magnet magnetically draws the first pole piece through the first segment toward the permanent magnet in order to magnetically couple the first pole piece to the permanent magnet as the permanent magnet moves toward the second position. In response, the first pole disengages from a diaphragm of the valve device to allow fluid flow through the diaphragm. The magnetic force is then reapplied to the permanent magnet in order to reciprocate the permanent magnet through the second segment from the second position to the first position. The first pole piece magnetically decouples from the permanent magnet when the permanent magnet moves to the first position such that the first pole piece moves back through the first segment and re-engages with the diaphragm of the valve device.

BRIEF DESCRIPTION OF THE DRAWINGS

The objects of the disclosure are achieved as set forth in the illustrative embodiments shown in the drawings, which form a part of this specification.

Corresponding reference characters indicate corresponding parts throughout the several views of the drawings.

DETAILED DESCRIPTION OF THE DISCLOSURE

The following detailed description illustrates the disclosure by way of example and not by way of limitation. This description will clearly enable one skilled in the art to make and use the disclosure, and describes several embodiments, adaptations, variations, alternatives and uses of the disclosure including what we presently believe is the best mode of carrying out the disclosure. As various changes could be made in the constructions discussed herein without departing from the scope of the disclosure, it is intended that all matter contained in the description are shown in the accompanying drawings shall be interpreted as illustrative and not in a limited sense.

Figure 1:
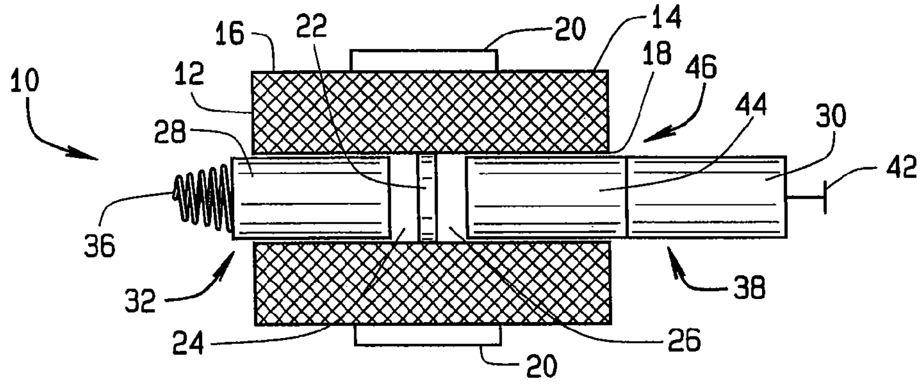
FIG. 1 is a cross sectional view of an operating condition of one illustrative embodiment of a bobbin of the solenoid of the present disclosure.

Referring now to FIG. 1, reference numeral 10 indicates one illustrative embodiment of solenoid of the present disclosure wherein the solenoid 10 includes a bobbin 12 having an axial length 14, an external surface 16 and an axial opening 18 extending through the axial length 14. As known in the art, electrical coil 20 winds about the bobbin 12 along the external surface 16.

Figure 3:
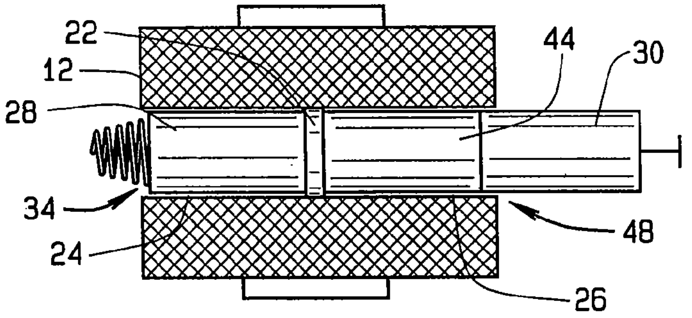
FIG. 3 is cross sectional view of a third operating condition of the bobbin of the present disclosure.

A divider 22 mounted in the axial opening 18 divides the axial opening 18 into a first segment 24 and a second segment 26. In an embodiment, the first segment 24 and the second segment 26 may have the same length. The segments 24, 26, though, may be of any length depending on the construction, strength and package size of the solenoid 10. The bobbin 12 further includes a first pole piece 28 and a second pole piece 30 positioned on opposite sides of the divider 22. As shown, the first pole piece 28 is movable within the first segment 24 between a retracted position 32 and an extended position 34 (FIG. 3). In the retracted position 32, the first pole piece 28 does not contact the divider 22. As such, a mechanical device 36 attaches to the first pole piece 28 to retract the first pole piece 28 axially outward from the divider 22 in the retracted position 32. In an embodiment, the mechanical device 36 may comprise a spring such as, but not limited to, a coil compression spring. The mechanical device 36 connects with a portion (not shown) of the solenoid 10.

Figure 2:
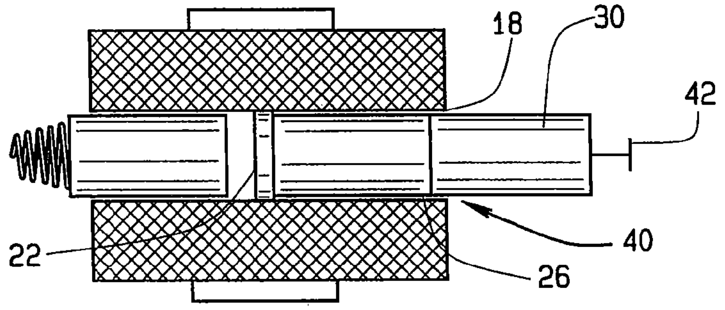
FIG. 2 is a cross sectional view of a second operating condition of the bobbin of the present disclosure.

Turning to FIG. 2 and referring to FIG. 1, the second pole piece 30 is moveable within the second segment 26 between an external position 38 (FIG. 1) and an internal position 40. In the external position 38, the second pole piece 30 may be fixed with respect to the bobbin 14. In the internal position 40, portions of the second pole piece 30 project into the axial opening 18. In an embodiment, a manual connection 42 such as an actuator may reciprocate the second pole piece 30 between the external position 38 and the internal position 40.

Referring to FIG. 3, the bobbin 12 further comprises a permanent magnet 44, which is moveable within the second segment 26 between at least a first position 46 (FIG. 1) and a second position 48. In the first position 46, the permanent magnet 44 magnetically couples with the second pole piece 30 when the second pole piece 30 is positioned in the external position 38 as shown in FIG. 1. In the second position 48, the permanent magnet 44 is positioned adjacent to the divider 22. In this position, the permanent magnet 44 magnetically draws the first pole piece 28 from the retracted position 32 (FIG. 1) to the extended position 34 to magnetically couple the first pole piece 28 to the permanent magnet 44 as will be discussed.

Figure 4:
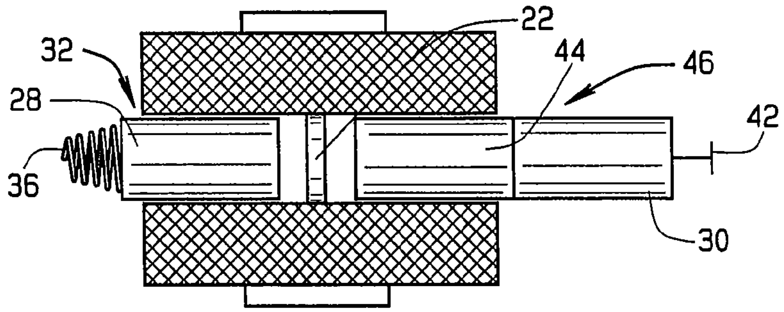
FIG. 4 is a cross sectional view of a fourth operating condition of the bobbin of the present disclosure.

As shown in FIG. 4, when the permanent magnet 44 reciprocates back to the first position 46 and adjacent the second pole piece 30, the mechanical device 36 retracts the first pole piece 28 to its retracted position 32. As such, the bobbin 12 of the solenoid 10 incorporates a freely moveable permanent magnet 44, which operates between first and second pole pieces 28, 30 while the divider 22 separates the first and second pole pieces 28, 30.

Referring to FIGS. 1-4, a manual method of operation of the present disclosure is shown. During operation, the divider 22 segments the bobbin 12 to form the first segment 24 and the second segment 26. As shown in FIG. 1, the mechanical device 36 retracts the first pole piece 28 to its retracted position 32. Additionally, the manual connection 42 positions the second pole piece 30 in the external position 38. In this position, the permanent magnet 44 magnetically couples to the second pole piece 30 in the first position 46 of the permanent magnet 44.

Turning to FIG. 2, the manual connection 42 actuates the second pole piece 30 to apply a force to the permanent magnet 44 while the permanent magnet 44 is disposed within the second segment 26 to reciprocate the permanent magnet 44 between the first position 46 and the second position 48. As such, actuating the second pole piece 30 moves the coupled permanent magnet 44 and second pole piece 30 to the second position 48. In the second position 48, the permanent magnet 44 moves adjacent to the divider 22.

Referring to FIG. 3, the permanent magnet 44 in the second position 48 magnetically draws the first pole piece 28 through the first segment 24 toward the permanent magnet 44 and adjacent the divider 22. Accordingly, the first pole piece 28 moves to its extended position 34 within the first segment 24. The first pole piece 28 magnetically couples to the permanent magnet 44 through the divider 22 when the permanent magnet 44 is in the second position 48. The first pole piece 28, the second pole piece 30 and the permanent magnet 44 will remain in this configuration until acted upon by another force.

As shown in FIG. 4, a force may be reapplied to the permanent magnet 44 which reciprocates the permanent magnet 44 and breaks the magnetic couple between the first pole piece 28 and the permanent magnet 44. As such, the first pole piece 28 retracts through the first segment 24 via the mechanical device 36 while the permanent magnet 44 reciprocates through the second segment 26 from the second position 48 to the first position 46. In an embodiment, reapplying the force to the permanent magnet 44 comprises actuating the second pole piece 30 via the manual connection 42 to move the coupled permanent magnet 44 and second pole piece 30 to the second position 48 which is separate from the divider 22. Moving the coupled permanent magnet 44 decouples the first pole piece 28 from the permanent magnet 44 such that the first pole piece 28 moves to the retracted position 32. As such, solenoid 10 of the present disclosure may use a manual operation by actuating the manual connection 42.

Figure 5:
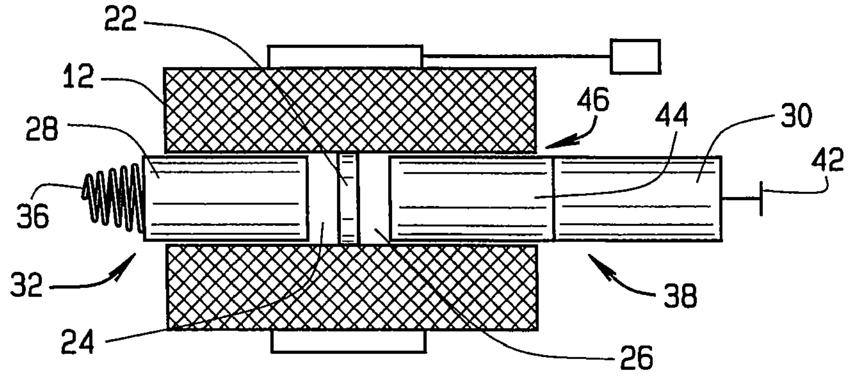
FIG. 5 is a cross sectional view of another operating condition of another illustrative embodiment of the bobbin of the present disclosure.

Referring to FIGS. 5-8, an automatic method of operation of the present disclosure is shown. During this operation, the divider 22 segments the bobbin 12 to form the first segment 24 and the second segment 26. As shown in FIG. 5, the mechanical device 36 retracts the first pole piece 28 to its retracted position 32. Additionally, the manual connection 42 positions the second pole piece 30 in the external position 38. In this embodiment, the second pole piece 30 remains fixed in the external position 38. Furthermore, in this position, the permanent magnet 44 magnetically couples to the second pole piece 30 in the first position 46 of the permanent magnet 44.

Figure 6:
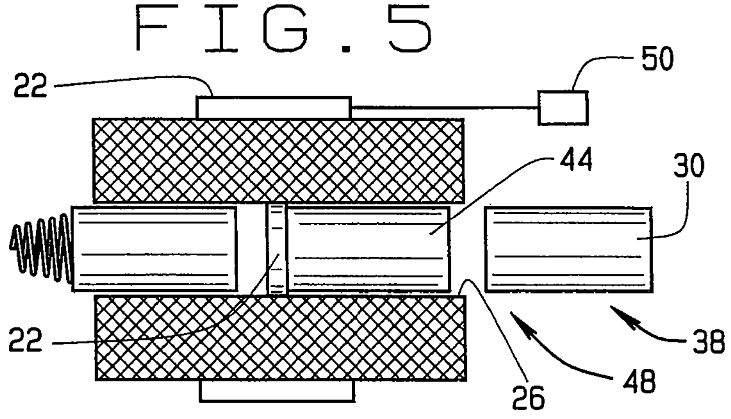
FIG. 6 is cross sectional view of a second operating condition of the bobbin of FIG. 5.

Turning to FIG. 6, the solenoid 10 applies a force to the permanent magnet 44 while the permanent magnet 44 is disposed within the second segment 26 to reciprocate the permanent magnet 44 between the first position 46 and the second position 48. In an embodiment, applying the force to the permanent magnet 44 comprises creating a magnetic filed having the same polarity as the permanent magnet 44. The solenoid 10 may create the magnetic field by energizing the electrical coils 22 with a small amount of current. In an embodiment, a power control device 50 attached to the electrical coil 20 may supply the current to the electrical coil 20. Since the second pole piece 30 remains fixed in its external position 38, the permanent magnet 44 decouples from the second pole piece 30 as the permanent magnet 44 moves to the second position 48. As such, applying the force moves the permanent magnet 44 to the second position 48 that is adjacent the divider 22.

Figure 7:
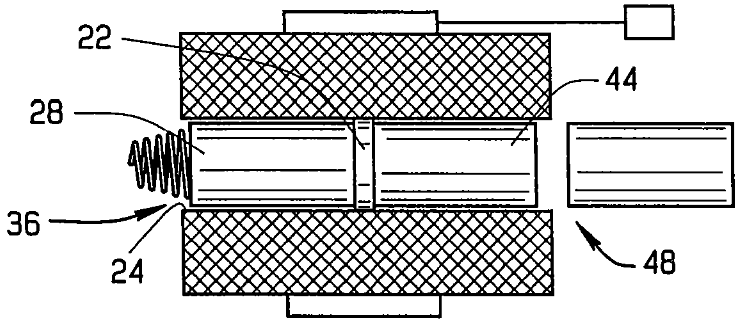
FIG. 7 is cross sectional view of a third operating condition of the bobbin of FIG. 5.

Referring to FIG. 7, the permanent magnet 44 in the second position 48 magnetically draws the first pole piece 28 through the first segment 24 toward the permanent magnet 44 and adjacent the divider 22. Accordingly, the first pole piece 28 moves to its extended position 34 within the first segment 24. The first pole piece 28 magnetically couples with the permanent magnet 44 through the divider 22 when the permanent magnet 44 is in the second position 48. The first pole piece 28, the second pole piece 30 and the permanent magnet 44 will remain in this configuration until acted upon by another force.

Figure 8:
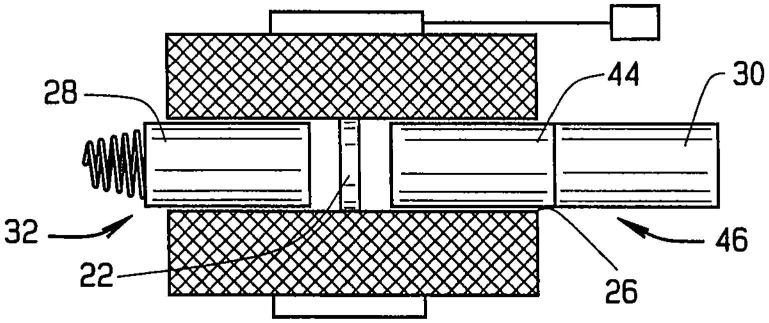
FIG. 8 is cross sectional view of a fourth operating condition of the bobbin of FIG. 5.

As shown in FIG. 8, a force may be reapplied to the permanent magnet 44 that breaks the magnetic couple of the first pole piece 28 and the permanent magnet 44 across the divider 22. As such, the first pole piece 28 retracts through the first segment 24 while the permanent magnet 44 reciprocates through the second segment 26 from the second position 48 to the first position 46. Accordingly, moving the coupled permanent magnet 44 decouples the first pole piece 28 from the permanent magnet 44 such that the first pole piece 28 moves to the retracted position 32.

In an embodiment, reapplying the force applied to the permanent magnet 44 comprises creating another magnetic field having the opposite polarity of the permanent magnet 44 wherein the other magnetic field reciprocates the permanent magnet 44 back to the first position 46. At the first position 46, the permanent magnet 44 magnetically couples with the second pole piece 30. In another embodiment, reapplying the force applied to the permanent magnet 44 comprises de-energizing the electrical coil 20 such that the permanent magnet 44 magnetically couples again to the second pole piece 30. As such, the solenoid 10 of the present disclosure may use an automatic operation by energizing the electrical coil 22. In another embodiment, reapplying the force may comprise activating the manual connection 42 to move the second pole piece 30 in magnetic contact with the permanent magnet 44 and then retracting the permanent magnet 44 and second pole piece 30.

Figure 9:
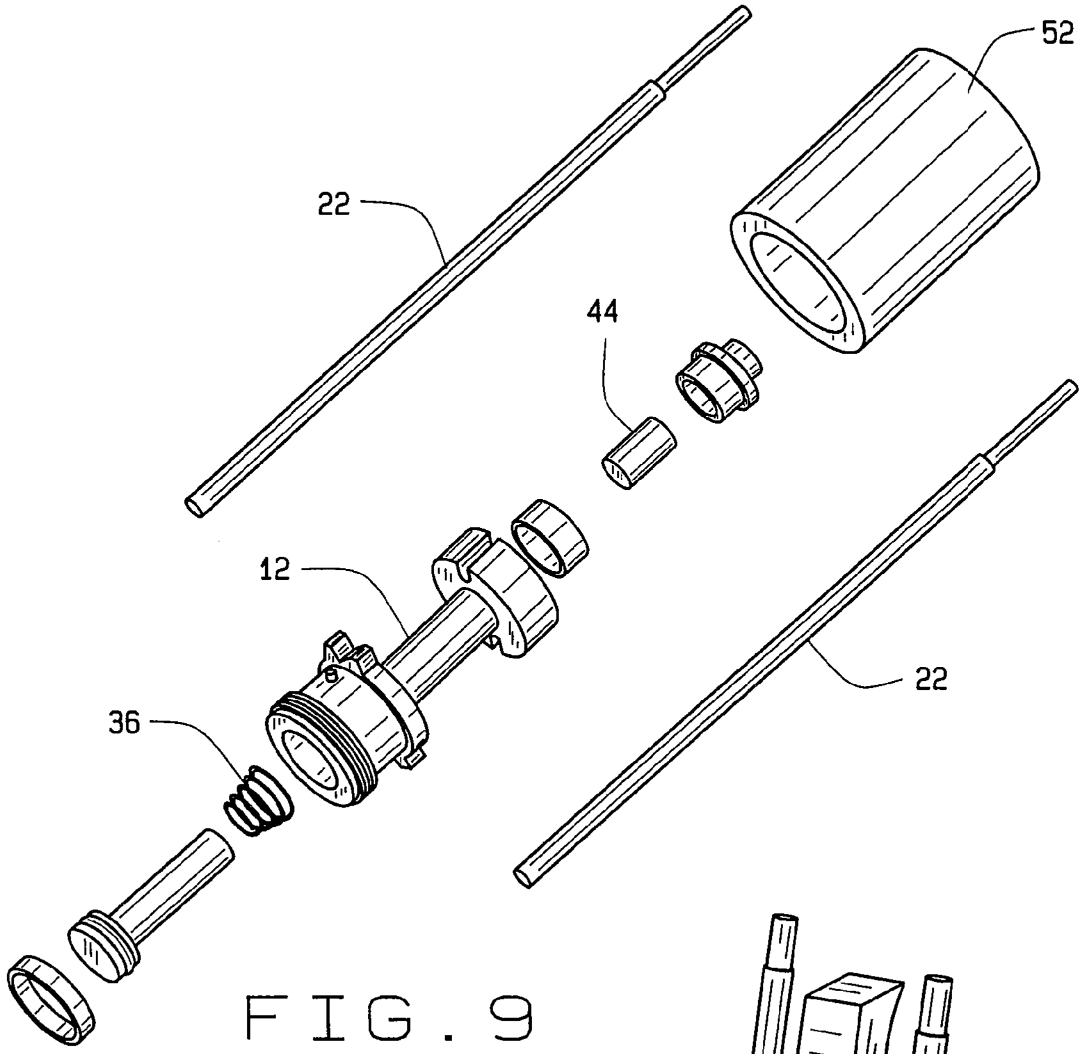
FIG. 9 is a breakaway perspective view of components of one illustrative embodiment of the solenoid of the present disclosure.
Figure 10:
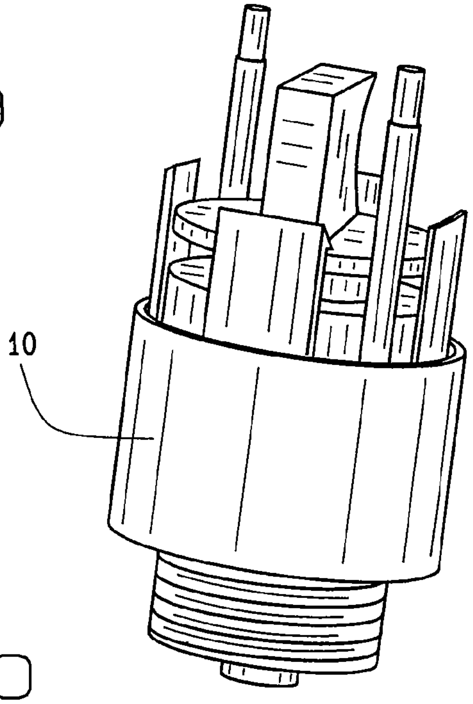
FIG. 10 is a perspective view of one illustrative embodiment of the solenoid of the present disclosure.

Turning to FIGS. 9 and 10, an embodiment of the present disclosure is shown. FIG. 9 illustrates in a perspective breakaway view components of the present disclosure. As shown, the solenoid 10 includes a protective cover mold 52 of non-electrically conductive material that surrounds at least the electrical coil 20. Additionally, FIG. 9 illustrates the bobbin 12, permanent magnet 44 and mechanical device 36 along with other components. FIG. 10 illustrates an embodiment of the solenoid 10 in assembled form.

Referring now to FIGS. 11-14, a valve device 54 that controls fluid flow (such as water) is shown. The valve device 54 includes a body 56 having an inlet end 58 and an outlet end 60. The inlet and outlet ends 58, 60 connect with tubing, hoses or piping as known. The inlet end 58 may relate to a high pressure end for fluid 62 entering the body 56 and the outlet end 60 may relate to a low pressure end for fluid 62 exiting the body 56. A valve (not shown) is interposed between the inlet end 58 and the outlet end 60. The valve device 54 further has a diaphragm 64 in operative connection with the body 56. The diaphragm 64 includes an orifice 66 defined therethrough at an outermost portion of the diaphragm 64. The diaphragm 64 also includes a flow port 67. Fluid 62 flows through the body 56, through the flow port 67 and against the diaphragm 64.

Figure 11:
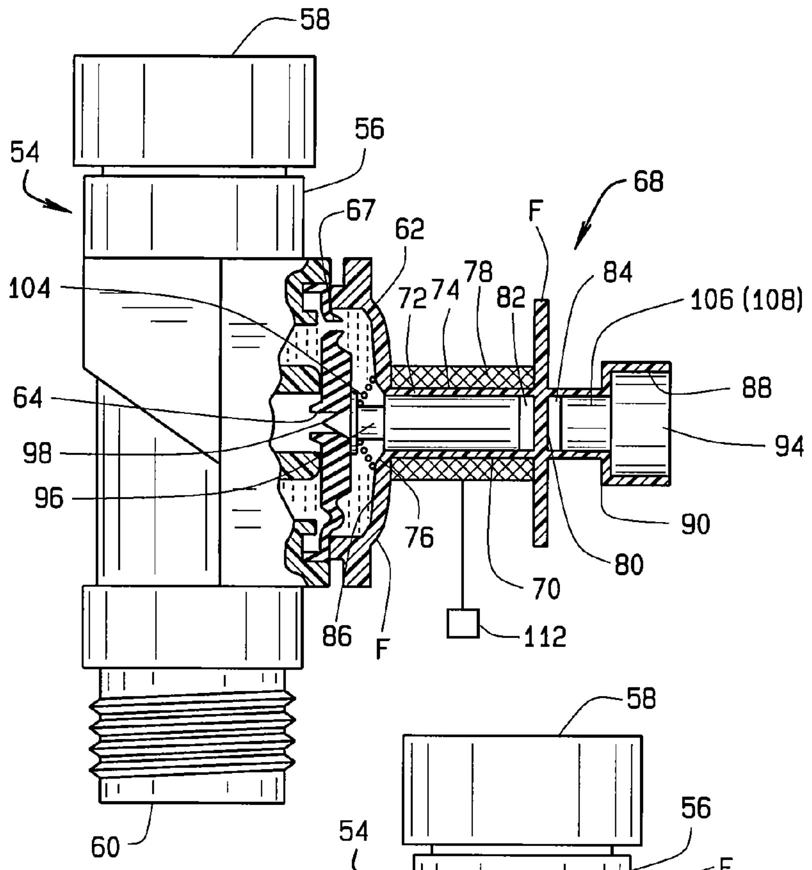
FIG. 11 is a cross sectional view of another operating condition of another illustrative embodiment of a solenoid of the present disclosure that is operatively connected with a valve device.

Turning to FIG. 11, a solenoid 68 of the present disclosure operatively connects with the body 56 of the valve device 54. In an embodiment, the solenoid 68 removably connects with the body 56 by fasteners such as but not limited to screws or threaded ends. In another embodiment, the solenoid 68 integrally forms with the body 56 by a process such as but not limited to a plastic molding process. Regardless of the interface between the solenoid 68 and the body 56, the solenoid connects with the body 56 in a position opposite the diaphragm 64.

Solenoid 68 includes a housing 70 having an axial length 72, an external surface 74 and an axial opening 76 extending through the axial length 72. An electrical coil 78 winds about the housing 70 along the external surface 74. Flanges F assist in maintaining the electrical coil 78 around the external surface 74.

A divider 80 mounted in the axial opening 76 separates the axial opening 76 into a first segment 82 and a second segment 84. The divider 80 may be positioned at a variety of locations within the axial opening 76. In an embodiment, the first segment 82 and the second segment 84 may have the same length. The segments 82, 84, though, may be of any length depending on the construction, strength and package size of the solenoid 68 and the position of the divider 80. The first segment 82 includes a fluid portion 86 that may have a larger radial area than the rest of the first segment 82. The fluid portion 86 partially surrounds the diaphragm 64 of the valve device 54. The second segment 84 includes a portion 88 that also may have a larger radial area than the rest of the second segment 84. This portion 88 forms a shoulder 90 within the second segment 84. The fluid portion 86 and portion 88 may be of any size and shape depending on the construction, strength and package size of the solenoid 68.

Figure 13:
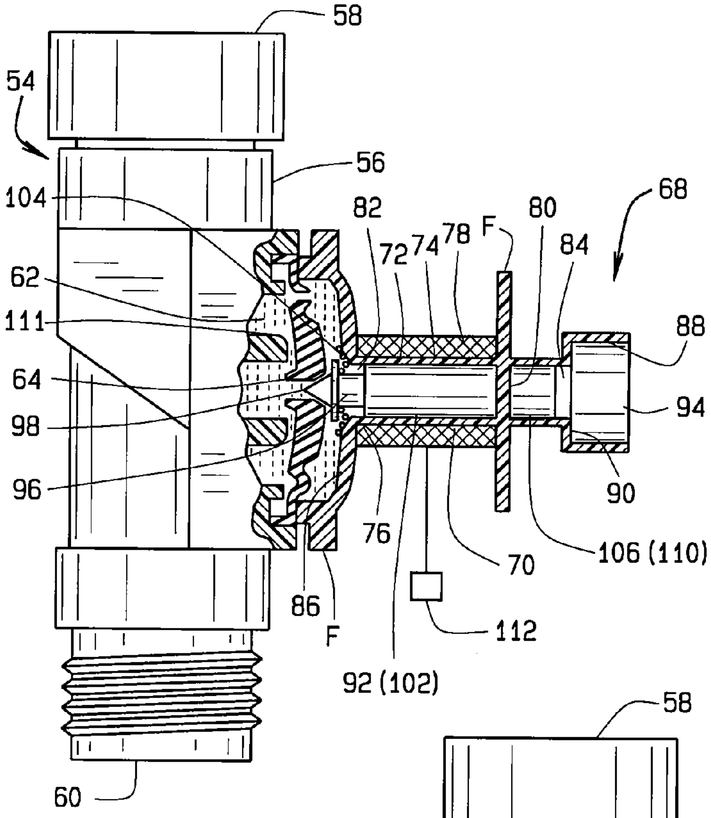
FIG. 13 is cross sectional view of a third operating condition of the solenoid of FIG. 11.

The housing 70 further includes a first pole piece 92 and a second pole piece 94 positioned on opposite sides of the divider 80. The first pole piece 92 has a plunger 96 positioned at end of the first pole piece 92 that is located in the fluid portion 86. As shown, the plunger 96 includes a tip 98. The first pole piece 92 is movable within the first segment 82 between an extended position 100 (FIG. 11) and a retracted position 102 (FIG. 13). In the extended position 100, the first pole piece 92 does not contact the divider 80. In the extended position 100, the tip 98 of the plunger 96 partially inserts within the orifice 66 of the diaphragm 64. In this extended position 100, the tip 98 prevents fluid 62 from entering the fluid portion 86 via the orifice 66. Fluid 62 however flows through flow port 67 and into the fluid portion 86. This fluid 62 maintains a stabilizing pressure against the diaphragm 64 with respect to the fluid 62 flowing through the body 56.

As will be discussed, the plunger 96 reciprocates within the fluid portion 86 when the first pole piece 92 moves between the extended position 100 and the retracted position 102 within the first segment 82. A mechanical device 104 operatively contacts the first pole piece 92 to extend the first pole piece 92 axially outward from the divider 80 in the extended position 100. In an embodiment, the mechanical device 104 may comprise a spring such as, but not limited to, a coil compression spring. The second pole piece 94 is fixed within the second segment 84. In particular, the second pole piece 94 is positioned against the shoulder 90. In an embodiment, the second pole piece 94 comprises a magnet.

Figure 12:
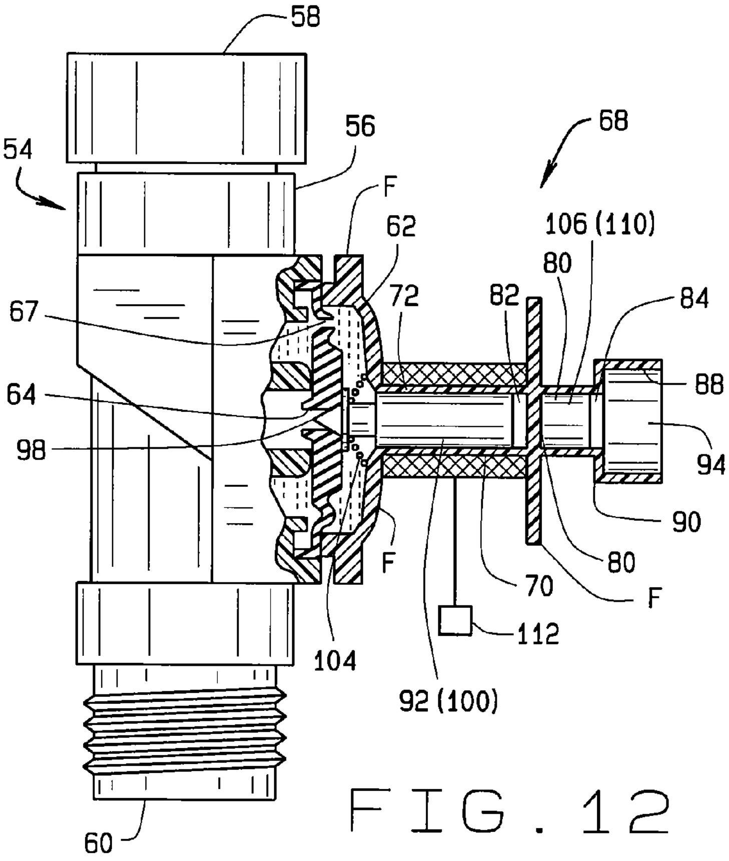
FIG. 12 is cross sectional view of a second operating condition of the solenoid of FIG. 11.

Referring to FIG. 12, solenoid 68 further comprises a permanent magnet 106 positioned within the second segment 84 between the divider 80 and the second pole piece 94. The permanent magnet 106 is moveable within the second segment 84 between at least a first position 108 (FIG. 11) and a second position 110 (FIGS. 12 and 13). In the first position 108, the permanent magnet 106 magnetically couples with the second pole piece 94 in a position adjacent the second pole piece 94. The second pole piece 94 and the permanent magnet 106 have polarities such that the permanent magnet magnetically couples with the second pole piece 94 when the permanent magnet is in the first position 108.

In the second position 110 (FIG. 12), the permanent magnet 106 is positioned adjacent to the divider 80. In this position, the permanent magnet 106 magnetically draws the first pole piece 92 from the extended position 100 (FIG. 12) to the retracted position 102 (FIG. 13) to magnetically couple the first pole piece 92 to the permanent magnet 106. Additionally, in the second position 110, the permanent magnet 106 moves the plunger 96 toward the divider 80. As shown, the tip 98 of the plunger 96 disengages from the orifice 66 to allow fluid flow through the orifice 66. Pressure of fluid 62 then lifts the diaphragm 64 off of seat 111 of the body 56 of the valve device 54 to allow fluid flow as shown in FIG. 13.

Figure 14:
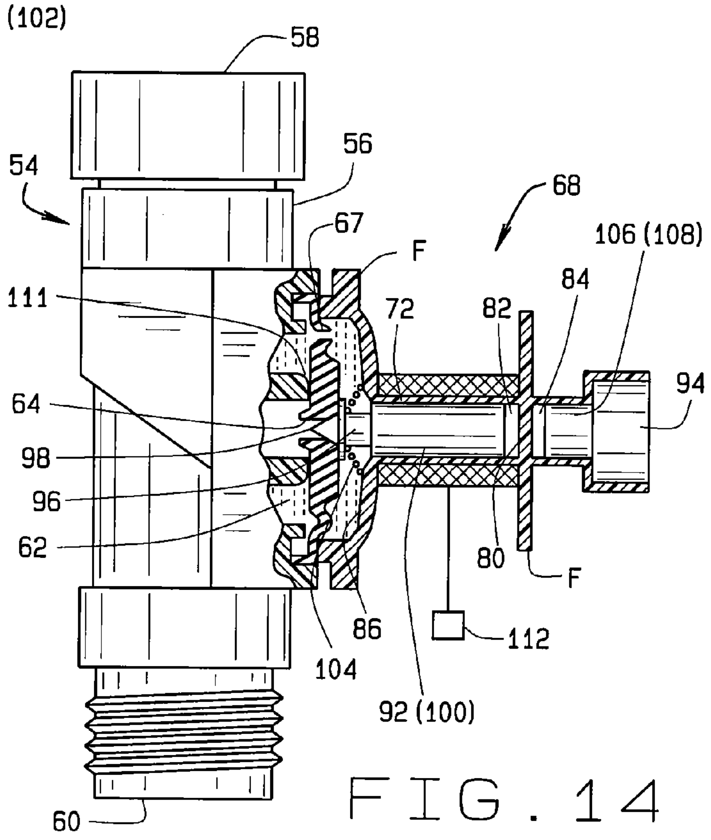
FIG. 14 is cross sectional view of a fourth operating condition of the solenoid of FIG. 11.

As shown in FIG. 14, when the permanent magnet 106 reciprocates back to the first position 108 and adjacent the second pole piece 94, the mechanical device 104 extends the first pole piece 92 to its extended position 100. The tip 98 re-engages with orifice 66 to seal the orifice 66. The pressure of the fluid 62 creates a vacuum that pulls the diaphragm 64 back onto seat 111. Fluid 62 positioned in the fluid portion 86 maintains a stabilizing pressure with respect to the fluid 62 flowing through body 56. The solenoid 68 incorporates a freely moveable permanent magnet 106, which operates between first and second pole pieces 92, 94 while the divider 80 separates the first and second pole pieces 92, 94.

Referring to FIGS. 11-14, operation of the present solenoid 68 is shown. In particular, the solenoid 68 regulates fluid flow through the valve device 54. During operation, the mechanical device 104 extends the first pole piece 92 to its extended position 100 (FIG. 11) to seal orifice 66 with plunger 96 and tip 98. Fluid 62 however flows through flow port 67 and into the fluid portion 86. This fluid 62 maintains a stabilizing pressure against the diaphragm 64 with respect to the fluid 62 flowing through the body 56. Additionally, as shown in FIG. 11, the permanent magnet 106 magnetically couples to the second pole piece 94 in the first position 108 of the permanent magnet 106.

Turning to FIG. 12, the solenoid 68 applies a magnetic force to the permanent magnet 106 while the permanent magnet 106 is disposed within the second segment 84 to reciprocate the permanent magnet 106 between the first position 108 and the second position 110. In an embodiment, applying the magnetic force to the permanent magnet 106 comprises creating a magnetic field having the same polarity as the permanent magnet 106. The solenoid 68 may create the magnetic field by energizing the electrical coils 78 with a small amount of current. In an embodiment, a power control device 112 attached to the electrical coil 78 may supply the current to the electrical coil 78. The power control device 112 electrifies the electrical coil 78 which in turn applies a magnetic force to move the permanent magnet 106 between the first position 108 and the second position 110. The magnetic field decouples the permanent magnet 106 from the fixed second pole piece 94 and the magnetic field moves the permanent magnet 106 to the second position 110 that is adjacent the divider 80. The shoulder 90 fixes or prevents the second pole piece 94 in the form of the magnet from moving under the influence of the magnetic field.

Referring to FIG. 13, the permanent magnet 106 in the second position 110 magnetically draws the first pole piece 92 through the first segment 82 toward the permanent magnet 106 and adjacent the divider 80. Accordingly, the first pole piece 92 moves to its retracted position 102 within the first segment 82. The first pole piece 92 magnetically couples with the permanent magnet 106 through the divider 80 when the permanent magnet 106 is in the second position 110. In the retracted position 102, the plunger 96 moves toward the divider 80 and disengages the tip 98 from the orifice 66 of the diaphragm 64. Fluid 62 then flows through the orifice 66 and into the fluid portion 86. Pressure of fluid 62 then lifts the diaphragm 64 off of seat 111 of the body 56 of the valve device 54 to allow fluid flow as shown in FIG. 13. The fluid 62 flowing through the body 56 experiences a pressure drop as some of the fluid 62 flows into the fluid portion 86. The first pole piece 92, the second pole piece 94 and the permanent magnet 106 will remain in this configuration until acted upon by another force.

As shown in FIG. 14, another force may be reapplied to the permanent magnet 106 that breaks the magnetic couple of the first pole piece 92 and the permanent magnet 106 across the divider 80. Accordingly, the mechanical device 104 forces the first pole piece 92 through the first segment 82 and into the extended position 100. The second pole piece 94 magnetically attracts permanent magnet 106 through the second segment 84 from the second position 110 to the first position 108. As such, moving the permanent magnet 106 decouples the first pole piece 92 from the permanent magnet 106 such that the first pole piece 92 moves to the extended position 100.

In an embodiment, reapplying the other force applied to the permanent magnet 106 comprises creating another magnetic field having the opposite polarity of the permanent magnet 106 wherein the other magnetic field reciprocates the permanent magnet 106 back to the first position 108. In this extended position, the tip 98 of the plunger 96 re-engages with the orifice 66 to seal diaphragm 64. The pressure of the fluid 62 creates a vacuum that pulls the diaphragm 64 back onto seat 111. Fluid 62 positioned in the fluid portion 86 maintains a stabilizing pressure with respect to the fluid 62 flowing through body 56. Additionally, the operative connection of the solenoid to the body 56 minimizes leaks from the diaphragm 64. At the first position 108, the permanent magnet 106 magnetically couples with the second pole piece 94. In another embodiment, reapplying the force applied to the permanent magnet 106 comprises de-energizing the electrical coil 78 such that the permanent magnet 106 magnetically couples again to the second pole piece 94 under the magnetic influence of the second pole piece 94.

In an embodiment, solenoid 68 may be remotely controllable and programmable. U.S. Pat. No. 6,337,635 issued to K. Ericksen et al. and incorporated herein by reference teaches a remotely controllable and programmable system.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

Having thus described the disclosure, what is claimed and desired to be secured by Letters Patent is:

1. A solenoid comprising:

a housing having an axial length, an external surface, an axial opening extending through the axial length and a divider mounted in the axial opening to separate the axial opening into a first segment and a second segment;

a first pole piece moveable with the first segment between an extended position and a retracted position, the first pole piece having a plunger positioned at an end of the first pole piece;

a second pole piece fixed within the second segment; and a permanent magnet positioned within the second segment between the divider and the second pole piece, the permanent magnet movable within the second segment between a first position adjacent the second pole piece and a second position adjacent the divider, wherein the permanent magnet in the second position draws the first pole piece from the extended position to the retracted position to magnetically couple the first pole piece to the permanent magnet and to move the plunger toward the divider.

2. The solenoid of claim 1 further comprising an electrical coil wound about the housing along the external surface thereof and further comprising a power control device attached to the electrical coil, wherein the power control device electrifies the electrical coil which in turn applies a magnetic force to the permanent magnet to move the permanent magnet between the first position and the second position.

3. The solenoid of claim 1 further comprising a mechanical device operatively contacting the first pole piece, the mechanical device extending the first pole piece axially outward from the divider in the extended position.

4. The solenoid of claim 1 wherein the first segment includes a fluid portion having a larger radial area than the rest of the first segment.

5. The solenoid of claim 4 wherein the plunger reciprocates within the fluid portion when the first pole piece moves between the extended position and the retracted position.

6. The solenoid of claim 2 wherein the second segment includes a portion having a larger radial area than the rest of the second segment, the portion forming a shoulder within the second segment.

7. The solenoid of claim 6 wherein the second pole piece is positioned within the portion.

8. The solenoid of claim 7 wherein the second pole piece comprises a magnet.

9. The solenoid of the claim 8 wherein the second pole piece and the permanent magnet have polarities such that the permanent magnet magnetically couples with the second pole piece when the permanent magnet is in the first position.

10. The solenoid of claim 9 wherein the magnetic force applied by the electrical current to the permanent magnet creates a magnetic field having the same polarity of the permanent magnet wherein the magnetic field decouples the permanent magnet from the fixed second pole piece and the magnetic field moves the permanent magnet to the second position.

11. In combination with a valve device having a body with a high pressure end, a low pressure end and a valve positioned between the high pressure end and the low pressure end, the body having a diaphragm with an orifice defined therethrough, a solenoid comprising:

a housing connected to the body in a position opposite the diaphragm, the housing having an axial length, an external surface, an axial opening extending through the axial length and a divider mounted in the axial opening to separate the axial opening into a first segment and a second segment;

a first pole piece moveable with the first segment between an extended position and a retracted position, the first pole piece having a plunger positioned at an end of the first pole piece such that the plunger partially inserts within the orifice when the first pole piece is in extended position;

a second pole piece fixed within the second segment;

a permanent magnet positioned within the second segment between the divider and the second pole piece, the permanent magnet movable within the second segment between a first position adjacent the second pole piece and a second position adjacent the divider; and an electrical coil wound about the housing along the external surface thereof, the electrical coil being configured to be electrified wherein the electrified electrical coil applies a magnetic force to the permanent magnet to move the permanent magnet between the first position and the second position such that the permanent magnet in the second position draws the first pole piece from the extended position to the retracted position to magnetically couple the first pole piece to the permanent magnet and to move the plunger out of the orifice of the diaphragm.

12. The solenoid of claim 11 further comprising a mechanical device operatively contacting the first pole piece, the mechanical device extending the first pole piece axially outward from the divider in the extended position.

13. The solenoid of claim 11 wherein the first segment includes a fluid portion having a larger radial area than the rest of the first segment and wherein the plunger reciprocates within the fluid portion when the first pole piece moves between the extended position and the retracted position such that fluid flowing through the body of the valve device flows through the orifice and into the fluid portion when the first pole piece is in the retracted position.

14. The solenoid of claim 11 wherein the second segment includes a portion having a larger radial area than the rest of the second segment, the second pole piece being positioned within the portion.

15. The solenoid of claim 14 wherein the second pole piece is a magnet.

16. The solenoid of the claim 15 wherein the second pole piece and the permanent magnet have polarities such that the permanent magnet magnetically couples with the second pole piece when the permanent magnet is in the first position.

17. The solenoid of claim 16 wherein the magnetic force applied by the electrical current to the permanent magnet creates a magnetic field having the same polarity of the permanent magnet wherein the magnetic field decouples the permanent magnet from the fixed second pole piece and the magnetic field moves the permanent magnet to the second position.

* * * * *